United States Patent
Bali et al.

(10) Patent No.: US 10,691,369 B2
(45) Date of Patent: Jun. 23, 2020

(54) POOL PARTNER BASED REPLICATION

(71) Applicant: HEWLETT PACKARD ENTERPRISE DEVELOPMENT LP, Houston, TX (US)

(72) Inventors: Naveen Bali, Durham, NC (US); Neha Siddha, San Jose, CA (US); Michael E. Root, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/960,226

(22) Filed: Apr. 23, 2018

(65) Prior Publication Data

US 2019/0324651 A1    Oct. 24, 2019

(51) Int. Cl.
*G06F 3/06* (2006.01)

(52) U.S. Cl.
CPC ............ *G06F 3/065* (2013.01); *G06F 3/0619* (2013.01); *G06F 3/0644* (2013.01); *G06F 3/0683* (2013.01)

(58) Field of Classification Search
None
See application file for complete search history.

(56) References Cited

U.S. PATENT DOCUMENTS

| | | | |
|---|---|---|---|
| 7,111,189 B1 | 9/2006 | Sicola et al. | |
| 7,480,853 B2 | 1/2009 | Flanagin et al. | |
| 7,539,836 B1 | 5/2009 | Klinkner et al. | |
| 7,788,223 B2 | 8/2010 | Liu et al. | |
| 2008/0104347 A1* | 5/2008 | Iwamura | G06F 11/2076 711/162 |
| 2015/0234618 A1* | 8/2015 | Miwa | G06F 3/0617 711/165 |
| 2016/0092463 A1 | 3/2016 | Vijayan | |

OTHER PUBLICATIONS

Vwannabe, "Data Migration Using Nimble Replication," (Research Paper), May 24, 2016, 10 pages. https://vwannabe.com/2016/05/24/data-migration-using-nimble-replication.

Raihan Al-Beruni, "How to configure SAN replication between IBM Storwize V3700 systems," available online at <https://araihan.wordpress.com/2015/02/02/how-to-configure-san-replication-between-ibm-storwize-v3700-systems/>, Feb. 2, 2015, 16 pages.

(Continued)

*Primary Examiner* — Denise Tran
(74) *Attorney, Agent, or Firm* — Hewlett Packard Enterprise Patent Department

(57) ABSTRACT

In some examples, with respect to pool partner based replication, a first pool may be generated for a first storage array and may include a first volume of data stored in a storage space of the first storage array. A second pool may be generated for a second storage array and may include a second volume to receive data replicated from the first volume. Based on the generation of the second pool, first and second pool partners respectively representing end points for communication with the first and second pools may be generated. A volume collection may be generated and may include identifications of the first pool partner and the second pool partner, and a first volume identification of the first volume. Based on the volume collection, replication of the first volume may be performed from the first pool to the second volume of the second pool.

20 Claims, 9 Drawing Sheets

(56) References Cited

OTHER PUBLICATIONS

Larry Touchette, "ActiveCluster—Simple Stretch Clustering for All", available online at <https://blog.purestorage.com/activecluster-simple-stretch-clustering/>, Jun. 12, 2017, 10 pages.
Tech Field Day, "Pure Storage Purity ActiveCluster with Tabriz Holtz," (transcript), available online at <https://www.youtube.com/watch?v=muqYe7j4beE>, Jun. 13, 2017.

* cited by examiner

FIG. 2

Pool Partners — 200

| Pool Partner | Pool Partner Name | Pool Partner Unique Identifier | Associated Pool | Associated Pool Unique Identifier | Secret Key |
|---|---|---|---|---|---|
| 1 | Pool1 | XYZ1 | Pool1 | ABC1 | KEY1 |
| 2 | Pool2 | XYZ2 | Pool2 | ABC2 | KEY2 |
| 3 | Pool3 | XYZ3 | Pool3 | ABC3 | KEY3 |
| . | . | . | . | . | . |
| n | Pooln | XYZn | Pooln | ABCn | KEYn |

300

Pools

| Pool | Pool Name | Pool Unique Identifier |
|---|---|---|
| 1 | Pool1 | ABC1 |
| 2 | Pool2 | ABC2 |
| 3 | Pool3 | ABC3 |
| . | . | . |
| . | . | . |
| n | Pooln | ABCn |

FIG. 3

| Arrays | | | | | | |
|---|---|---|---|---|---|---|
| Array | Array Name | Array Unique Identifier | Associated Pool | Associated Pool Unique Identifier | Cluster Internet Protocol Address | Synchronous Replication Port |
| 1 | Array1 | MNO1 | Pool1 | ABC1 | CIPA1 | SRP1 |
| 2 | Array2 | MNO2 | Pool1 | ABC1 | CIPA2 | SRP2 |
| 3 | Array3 | MNO3 | Pool2 | ABC2 | CIPA3 | SRP3 |
| . | . | . | . | . | . | . |
| . | . | . | . | . | . | . |
| n | Arrayn | MNOn | Pooln | ABCn | CIPAn | SRPn |

```
GENERATE, FOR A FIRST STORAGE ARRAY OF A GROUP, A FIRST
POOL THAT INCLUDES A FIRST VOLUME OF DATA IN A STORAGE
SPACE OF THE FIRST STORAGE ARRAY THAT IS ALLOCATED TO THE
FIRST VOLUME
802
```

```
GENERATE, FOR A SECOND STORAGE ARRAY THAT IS ADDED TO THE
GROUP, A SECOND POOL THAT IS TO INCLUDE A SECOND VOLUME TO
RECEIVE DATA REPLICATED FROM THE FIRST VOLUME FROM THE
FIRST POOL TO THE SECOND POOL
804
```

```
GENERATE, BASED ON THE GENERATION OF THE SECOND POOL, A
FIRST POOL PARTNER REPRESENTING AN END POINT FOR
COMMUNICATION WITH THE FIRST POOL AND A SECOND POOL
PARTNER REPRESENTING AN END POINT FOR COMMUNICATION WITH
THE SECOND POOL
806
```

```
GENERATE A VOLUME COLLECTION THAT INCLUDES A FIRST
IDENTIFICATION OF THE FIRST POOL PARTNER, A SECOND
IDENTIFICATION OF THE SECOND POOL PARTNER, AND A FIRST
VOLUME IDENTIFICATION OF THE FIRST VOLUME
808
```

```
PERFORM, BASED ON THE VOLUME COLLECTION, REPLICATION OF
THE FIRST VOLUME FROM THE FIRST POOL TO THE SECOND VOLUME
OF THE SECOND POOL
810
```

*FIG. 8*

POOL PARTNER BASED REPLICATION

BACKGROUND

Synchronous data replication may include a source storage device (e.g., an upstream device) that accepts new data and sends the data to a destination storage device (e.g., a downstream device). In this regard, the destination storage device may contain a replica of data stored in the source storage device (e.g., as a backup).

BRIEF DESCRIPTION OF DRAWINGS

Features of the present disclosure are illustrated by way of example and not limited in the following figure(s), in which like numerals indicate like elements, in which:

FIG. 2 illustrates an example pool partners table to illustrate operation of the pool partner based replication apparatus of FIG. 1;

FIG. 3 illustrates an example pools table to illustrate operation of the pool partner based replication apparatus of FIG. 1;

FIG. 4 illustrates an example arrays table to illustrate operation of the pool partner based replication apparatus of FIG. 1;

FIG. 8 illustrates an example flowchart of a method for pool partner based replication.

DETAILED DESCRIPTION

Figure 1:
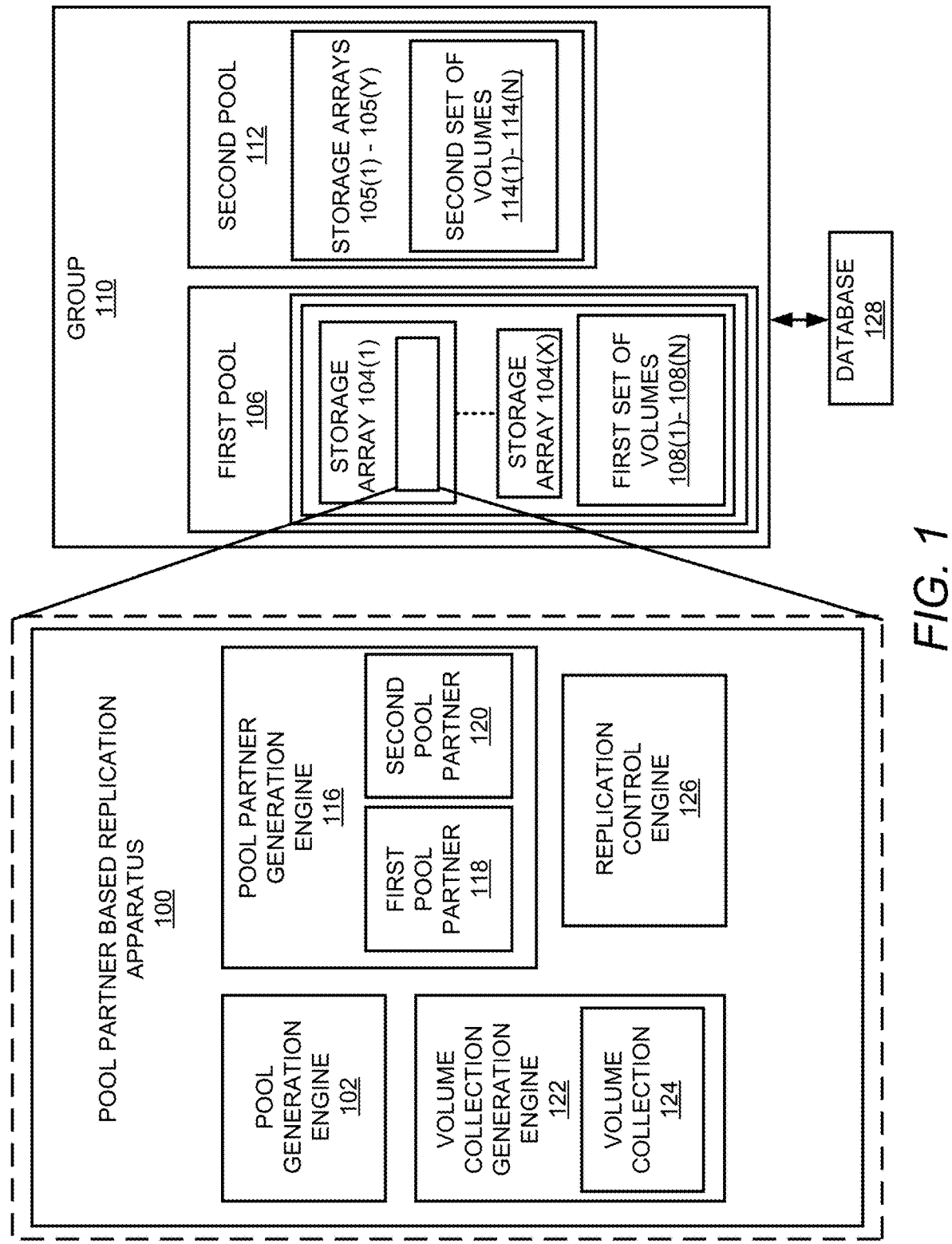
FIG. 1 illustrates an example layout of a pool partner based replication apparatus.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Pool partner based replication apparatuses, methods for pool partner based replication, and non-transitory computer readable media having stored thereon machine readable instructions to provide pool partner based replication are disclosed herein. The apparatuses, methods, and non-transitory computer readable media disclosed herein provide for generation of pool partners to perform replication with respect to upstream and downstream devices. In this regard, as an example, the upstream device may be a source storage device that accepts new data and the downstream device may be a destination storage device that receives data sent from the upstream device as part of synchronous data replication. As used herein, an upstream or downstream "device" may be a computing device. As used herein, a "computing device" may be a storage array, storage device, server, desktop or laptop computer, switch, router, or any other processing device or equipment including a processing resource.

With respect to data replication, the upstream and downstream devices may recognize and communicate with each other before replication may commence. The configuration may include, for example, allocation and assignment of parameters such as host names, Internet Protocol (IP) addresses, etc., to each of the devices. The configuration of the devices may include correctly defining the parameters for the devices, which may be an error-prone process. Further, a hand-shake mechanism may be implemented between the devices to implement communication between the devices. Each of these aspects may be error-prone due to technical challenges associated with parameter definition, hand-shake implementation, etc.

The apparatuses, methods, and non-transitory computer readable media disclosed herein address at least the aforementioned technical challenges by generating pool partners to facilitate the replication from upstream devices to and downstream devices. For example, with respect to a group of storage arrays that includes a first storage array (e.g., including controller(s) and a plurality of storage devices), a first pool may be generated and may include a first volume of data stored in storage space of the first storage array that is allocated to the first volume. The storage space may be space in a single storage device or multiple storage devices of the first storage array.

When a second storage array is added to the group, a second pool may be generated, where the second pool may include a second volume to receive data replicated from the first volume. Based on the generation of the second pool, a first pool partner representing an end point for communication with the first pool and a second pool partner representing an end point for communication with the second pool may be generated. A volume collection may be generated and may include identification of the first and second pool partners as well as identification of the first volume. In this regard, a second volume identification may be added to the volume collection upon configuration of synchronous replication between the first volume and the second volume in the volume collection. During synchronous replication, the first volume from the first pool may be replicated to the second volume of the second pool.

In examples described herein, a volume may be a logical unit of storage to which storage spaces or locations in physical storage (e.g., storage device(s) in storage array(s)) may be allocated for storage of data. Data stored in physical locations allocated to a volume may be considered data stored in the volume. With respect to a Small System Computer Interface (SCSI) target, a SCSI logical unit number (LUN) may represent or otherwise correspond to a volume. In examples described herein, a storage device may be a solid state drive (SSD), a hard disk drive (HDD), or any other suitable storage device.

In examples described herein, a pool may be a collection of volumes of data stored in storage spaces of storage arrays.

In examples described herein, a pool partner may represent an end point for communication with a pool. A user may write data into an upstream array in a first pool, and the data may subsequently be replicated from the upstream array to a downstream array in a second pool using the communication information included in the pool partner for the pool.

With respect to a pool partner, a database may store configuration information, for example, with respect to a group as disclosed herein. The database may include multiple tables, with one table being a pool partner table, where every pool partner may include a row that includes information related to that pool partner (e.g., name, identification (ID), etc.).

In examples described herein, a volume collection may represent a collection of volumes that forms a consistency set and includes pool partners to represent upstream and downstream pools. A consistency set may be used to treat a collection of volumes as a single entity, for example, for purposes of crash consistency and snapshot consistency. As an example, there may be two volumes (V1 and V2) in a volume collection, and a snapshot may cover both volumes (V1 and V2).

In examples described herein, a group may be a set of one or more storage arrays that constitute a common SCSI target. The group may also be the unit for software update. A group may include multiple pools. If there is more than one array in a pool, then volumes may be divided across multiple arrays. A group may represent a top level abstraction. According to examples described herein, management with respect to replication may occur at the group level.

In examples described herein, for two arrays, part of a volume may be associated with one array and another part of the volume may be associated with another array. A host may consider the volume as a single volume.

In examples described herein, when replicating, from a first pool 106 (e.g., see FIG. 1 that is described in further detail below) to a second pool 112, two pool partners 118, 120 may be generated, a first pool partner 118 associated with first pool 106 and a second pool partner 120 associated with second pool 112, for example. In some examples, a pool partner associated with a pool may have the same name as the pool to which it is associated, to facilitate identification of the pool associated with the pool partner. Once the pool partners are defined, replication may proceed without certain configurations being made manually, as described herein. In some examples, pool partners may be generated along with the generation of an associated pool. In such examples, the pool partners that were generated for the pools may be used for later replication between the pools.

In some examples, pool partners may be generated when updating a group that already has two or more pools to include a further pool that may support synchronous replication. In such examples, pool partners may be generated (e.g., one per pool) upon addition of the further pool as disclosed herein.

In some examples, when a second pool is added to a group that has one pool, two pool partners may be generated, one pool partner for each pool in the group.

In some examples, the name of a pool partner may be updated when the name of the pool associated with the pool partner is changed. Further, when a pool is deleted, the associated pool partner may also be deleted. Thus, when a pool is deleted from a group that includes two pools, the resulting single pool group may include no pool partners.

In examples described herein, engine(s) may be any combination of hardware and programming to implement the functionalities of the respective engine(s). In some examples described herein, the combinations of hardware and programming may be implemented in a number of different ways. For example, the programming for the engines may be processor executable instructions stored on a non-transitory machine-readable storage medium and the hardware for the engines may include a processing resource to execute those instructions. In these examples, a computing device implementing such engines may include the machine-readable storage medium storing the instructions and the processing resource to execute the instructions, or the machine-readable storage medium may be separately stored and accessible by the computing device and the processing resource. In some examples, some engines may be implemented in circuitry.

FIG. 1 illustrates an example layout of a pool partner based replication apparatus (hereinafter also referred to as "apparatus 100").

Referring to FIG. 1, the apparatus 100 may include a pool generation engine 102 to generate, for one or more storage arrays of a plurality of storage arrays 104(1)-104(x), a first pool 106 that includes a first volume of data stored in a storage space of the one or more storage arrays that are allocated to the first volume. In the example of FIG. 1, the apparatus 100 is illustrated as being in one of the storage arrays 104(1)-104(x) (e.g., storage array 104(1)). For instance, the apparatus 100 may be a storage device in the storage array 104(1). However, the apparatus 100 may be in any of the storage arrays 104(1)-104(x). According to examples, the first volume may represent a single first volume. Alternatively, the first volume may be part of a first set of volumes 108(1)-108(n) as shown in FIG. 1. Further, the storage arrays 104(1)-104(x) and the first pool 106 may be included in a group 110.

The pool generation engine 102 may generate, for one or more storage arrays of a plurality of storage arrays 105(1)-105(y), a second pool 112 that may include a second volume to receive data replicated from the first volume. According to examples, the second volume may represent a single second volume. Alternatively, the second volume may be part of a second set of volumes 114(1)-114(n) as shown in FIG. 1. Further, the one or more storage arrays of the plurality of storage arrays 105(1)-105(y) and the second pool 112 may be included in the group 110.

The group 110 may include additional pools (e.g., a third pool, a fourth pool, etc.). However, for the example of FIG. 1, the group 110 is shown to include the first pool 106 and the second pool 112 to facilitate a description of the apparatus 100.

In response to the generation of the second pool 112, a pool partner generation engine 116 may generate a first pool partner 118 corresponding to the first pool 106 and a second pool partner 120 corresponding to the second pool 112. Each pool partner may represent an end point for communication with a respective pool.

Information with respect to the pool partners and pools that are generated as disclosed herein, and the associated arrays, may be stored, for example, in table formats in a configuration database 128. Although information with respect to the pool partners, the pools, and the associated arrays is described as being contained in tables, in other examples, the information may be stored in any suitable form or format.

For example, FIG. 2 illustrates an example pool partners table 200 containing pool partner information, FIG. 3 illustrates an example pools table 300 containing pool information, and FIG. 4 illustrates an example arrays table 400 containing array information, to illustrate operation of the apparatus 100.

Referring to FIG. 2, the pool partner information (e.g., in the pool partners table 200 as illustrated in FIG. 2) may include, for each pool partner (e.g., numbered 1-n respectively in FIG. 2), a respective pool partner name (e.g., "Pool1") that matches the name of a pool (e.g., "Pool1") associated with the pool partner, a respective pool partner unique identifier (e.g., "XYZ1"), a name of the pool (e.g., "Pool1") associated with the pool partner, and a respective pool unique identifier (e.g., "ABC1") for the pool associated with the pool partner. In some examples, the pool partner information of FIG. 2 may also include, for each pool partner, information that may be used for communication authentication, such as a secret key (e.g., secret key "KEY1" for pool partner 1).

Referring to FIG. 3, pool information (e.g., in a pool table 300 as illustrated in FIG. 3), may include, for each pool (e.g., numbered 1-n respectively in FIG. 3) a respective pool name (e.g., "Pool1"), and a respective pool unique identifier (e.g., "ABC1"). For the pools table of FIG. 3, the pools may include n pool names, and n associated pool unique identifiers.

Referring to FIG. 4, array information (e.g., in an arrays table 400 as illustrated in FIG. 4) may include, for each array (e.g., numbered 1-n respectively in FIG. 4), a respective array name (e.g., "Array1"), a respective array unique identifier (e.g., "MNO1"), a name of an associated pool (e.g., "Pool1") to which the array belongs, a pool unique identifier (e.g., "ABC1") for the associated pool, a cluster Internet Protocol (IP) address (e.g., represented by an identifier in FIG. 4, such as CIPA1) that may be an IP address useable to communicate with the array, and information identifying a synchronous replication port (e.g., represented by an identifier in FIG. 4, such as SRP1), which is a network port of the array reserved for synchronous replication traffic.

Referring to FIGS. 2-4, the associated pool unique identifiers may be used as indexes into the configuration database tables, such as the pool partners table 200 of FIG. 2 and the arrays table 400 of FIG. 4, where the pool partners table 200 may also be used to store configuration information related to pool partners and pools. In this regard, the associated pool unique identifiers may represent the primary index values that connect rows in the pool partners table 200 of FIG. 2 to the pools table 300 of FIG. 3, and similarly the arrays table 400 of FIG. 4 to the pools table 300 of FIG. 3. For example, the pool unique identifier ABC2 may represent the primary index that connects row 2 in the pool partners table 200 of FIG. 2 to the pools table 300 of FIG. 3, and similarly the arrays table 400 of FIG. 4 to the pools table 300 of FIG. 3.

The configuration information related to pool partners and pools may include, for example, any type of "secret" in the pool partners table that may be used for communication authentication. For example, the first and second pool partners may respectively include secret keys (e.g., KEY1, KEY2, etc., as shown in FIG. 2) for communication authentication during the replication, for example, of the first volume from the first pool to the second volume of the second pool. For example, before data in the volumes may be replicated, a "handshake" operation may be performed where keys are exchanged and validated. Both pool partners that are subject to the "handshake" operation may share a common key or a user provided secret (e.g., a password), and when a communication session is being established for replication, this key or secret may be validated. Once the authentication is complete (e.g., the key or secret is validated), user data may be allowed to replicate.

In order to implement replication of volumes between different pools as disclosed herein, given the pool unique identifier for a particular pool, all arrays that are included in that pool may be identified to complete network configuration information for each array in a pool. In this regard, given a pool unique identifier, the array table of FIG. 4 may be analyzed to identify all arrays that have a matching pool unique identifier to determine the full list of arrays that belong to a pool. For the example of FIG. 4, arrays Array1 and Array2 that respectively include array unique identifiers MNO1 and MNO2 may belong to Pool", Array3 that includes the array unique identifier MNO3 may belong to Pool2, etc. Further, for each array, the cluster IP address and synchronous replication port may be obtained for completing the network configuration information for communication. Thus, a pool partner, which may include a pool unique identifier, may include information (e.g., the cluster IP address and synchronous replication port) to define an endpoint for communication. In this regard, the information (e.g., the cluster IP address and synchronous replication port) may be obtained from the arrays table 400 by using the pool unique identifier as an index into the arrays table 400.

Referring again to FIG. 1, according to examples, instead of the first pool partner 118 and second pool partner 120 respectively corresponding to the first pool 106 and the second pool 112, a pool partner may represent multiple pools. For example, a pool partner A may represent a pool A1 and a pool A2. In this case, the pool partner may include a pool partner unique identifier and a pool partner name, but the pool partner name may not match the pool name. Further, the pool unique identifier may not be stored with the pool partner, but may be stored with the pool, for example.

A volume collection generation engine 122 may generate a volume collection 124 that includes identification of the first pool 106 and the second pool 112, and identification of the first volume of the first set of volumes 108(1)-108(n) from the first pool 106. In this regard, an identification of the second volume of the second set of volumes 114(1)-114(n) of the second pool 112 may be added to the volume collection 124 upon performance of a replication operation as disclosed herein. Alternatively, the second volume of the second set of volumes 114(1)-114(n) of the second pool 112 may be added to the volume collection 124 upon generation of the volume collection 124. Additional volume collections may be generated as disclosed herein.

A replication control engine 126 may perform, based on the volume collection 124, replication of the first volume of the first set of volumes 108(1)-108(n) from the first pool 106 to the second volume of the second set of volumes 114(1)-114(n) of the second pool 112. According to examples, the replication may include synchronous replication of the first volume of the first set of volumes 108(1)-108(n) from the first pool 106 to the second volume of the second set of volumes 114(1)-114(n) of the second pool 112.

According to examples described herein, with respect to communication between pools during replication performance, a pool partner's name may be used to identify an associated pool as the source or destination for replication. Based on the pool name, an array associated with the pool may be identified, to further identify a network configuration that is utilized by the replication control engine 126 for the communication between the pools.

In some examples, the replication control engine 126 may perform, based on the volume collection 124, replication of the first set of volumes 108(1)-108(n) from the first pool 106 to the second set of volumes 114(1)-114(n) of the second pool 112.

In some examples, the volume collection generation engine 122 may generate a further volume collection (not shown) that includes identification of the first pool partner 118 and the second pool partner 120, and identification of a third volume and a fourth volume respectively corresponding to the first pool 106 and the second pool 112. In this regard, the replication control engine 126 may perform, based on the further volume collection, replication of the fourth volume from the second pool 112 to the third volume of the first pool 106.

In some examples, the first pool 106 may include a third set of volumes (not shown) including the third volume, and the second pool 112 may include a fourth set of volumes (not shown) including the fourth volume. In this regard, the replication control engine 126 may perform, based on the further volume collection, replication of the fourth set of the volumes from the second pool 112 to the third set of the volumes of the first pool 106.

Figure 5:
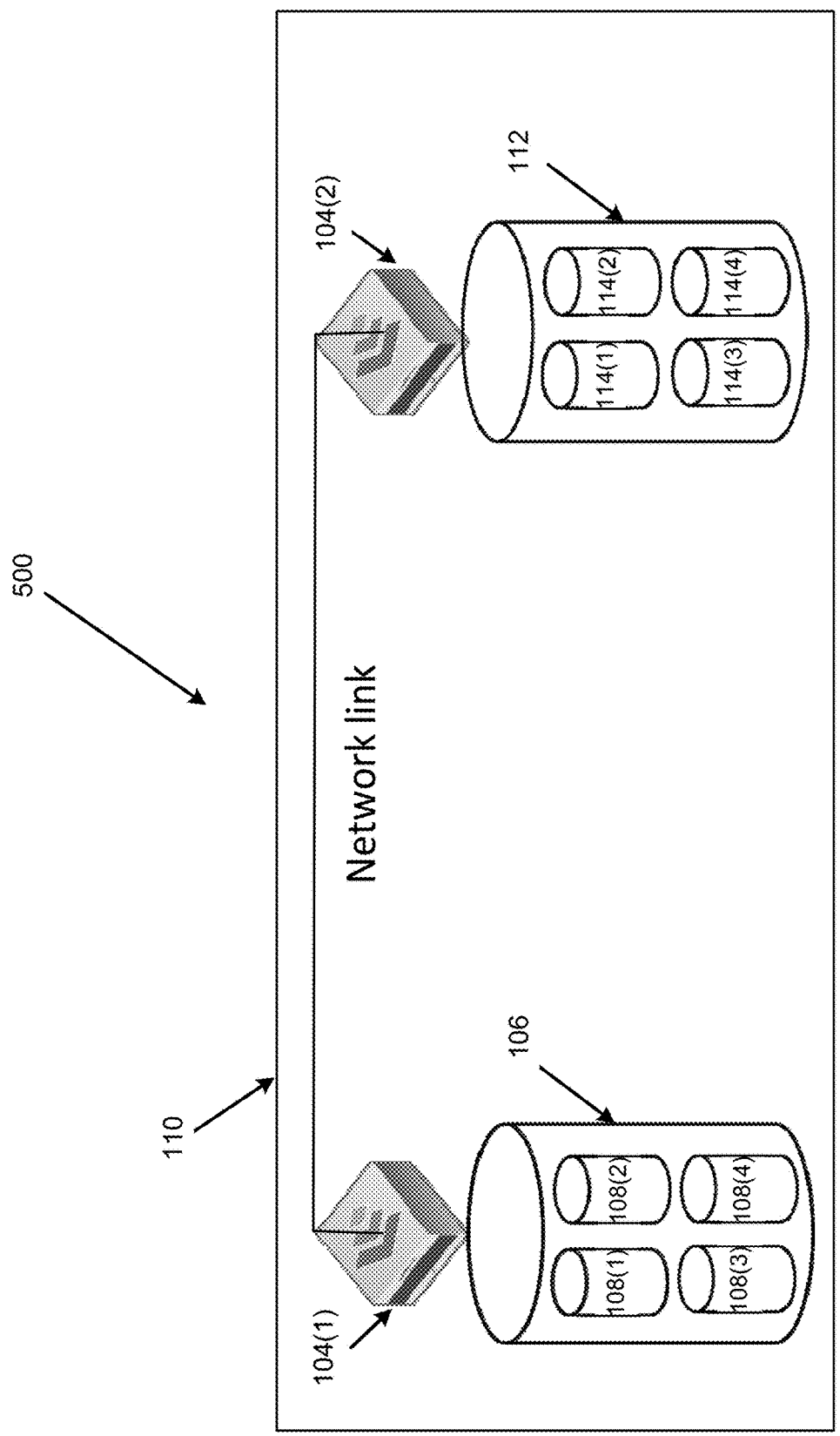
FIG. 5 illustrates an example layout of a group to illustrate operation of the pool partner based replication apparatus of FIG. 1.

FIG. 5 illustrates an example layout 500 of a group to illustrate operation of the apparatus 100.

Referring to FIG. 5, the example layout 500 may include a group 110 that includes an array 104(1) and a corresponding first pool 106 including volumes 108(1), 108(2), 108(3), and 108(4). Further, the group 110 may include an array 104(2) and a corresponding second pool 112 including volumes 114(1), 114(2), 114(3), and 114(4). In this example, volumes 108(1) and 108(3) may be replicated from first pool 106 to second pool 112, volume 114(2) may be replicated from second pool 112 to first pool 106, and volumes 108(4) and 114(4) may not be replicated. Further, a volume collection 124 may be defined as follows:

Volume Collection 124={(First Pool 106,Volume 108(1)),(First Pool 106,Volume 108(3)),(Second Pool 112,Volume 114(1)),(Second Pool 112, Volume 114(3)),(upstream partner=First Pool Partner 118),(downstream partner=Second Pool Partner 120)}

That is, for the volume collection 124, the volume collection may respectively include volume 108(1) in first pool 106, volume 108(3) in first pool 106, volume 114(1) in second pool 112, volume 114(3) in second pool 112, upstream pool partner including first pool partner 118, and downstream pool partner including second pool partner 120. These entities may define the parameters for replication by the replication control engine 126. For the example of FIG. 6, the source may be the upstream pool partner including first pool partner 118 and the destination may be the downstream pool partner including second pool partner 120. The source volumes may include volume 108(1) and volume 108(3) that belong to first pool 106, and the destination volumes may include volume 114(1) and volume 114(3) that belong to second pool 112. The volume collection may thus include a set of volumes that are treated as a unit for replication purposes. Further, in order to synchronously replicate a set of volumes from one pool to another, the pool partner associated with the destination pool may be added to the volume collection. The pool partner associated with the source pool may be identified implicitly from the pool name to which the volumes belong.

Figure 6:
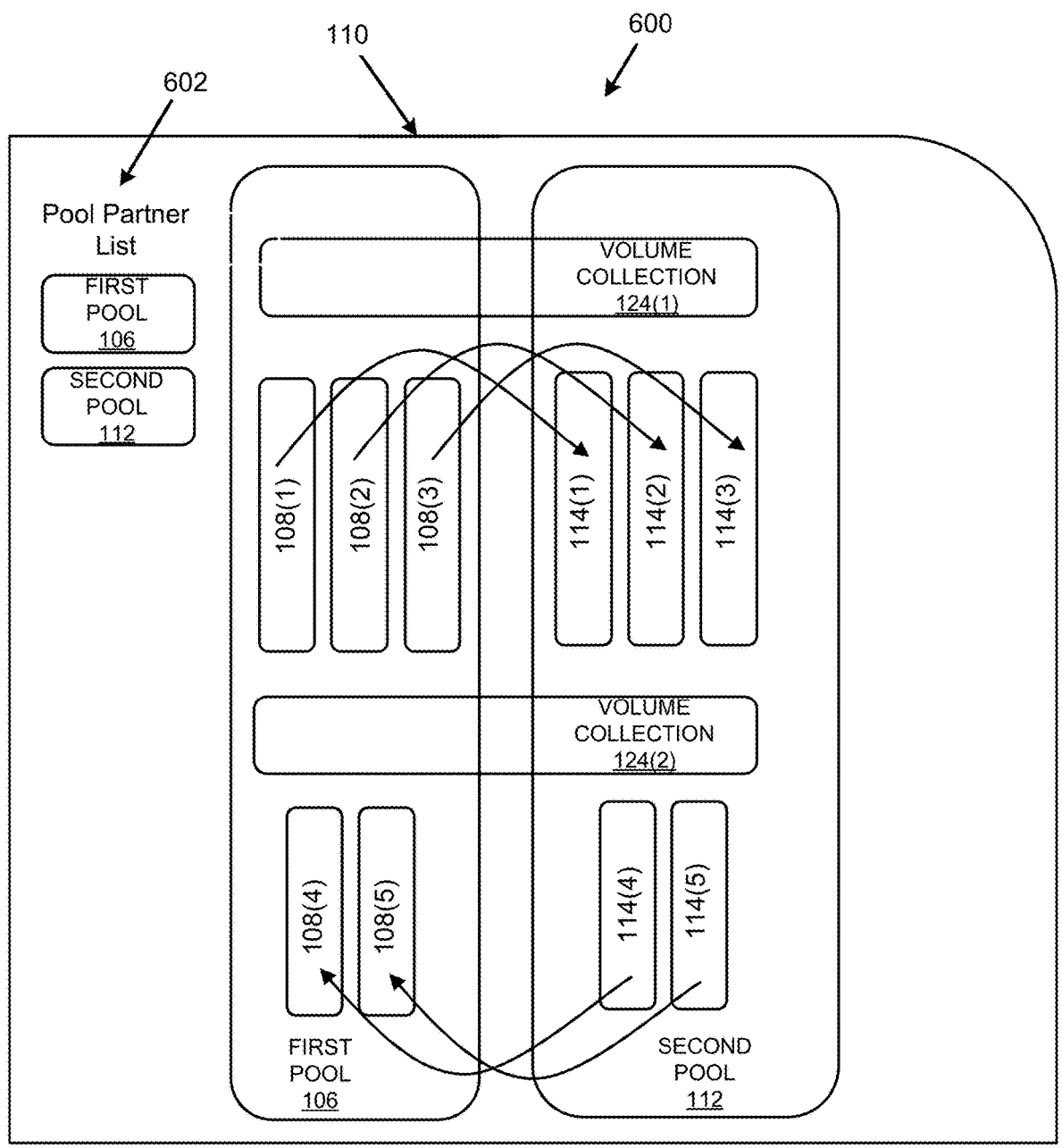
FIG. 6 illustrates an example layout of another group to illustrate operation of the pool partner based replication apparatus of FIG. 1.

FIG. 6 illustrates an example layout 600 of another group to illustrate operation of the pool partner based replication apparatus of FIG. 1.

Referring to FIG. 6, the example layout 600 may include a group 110 that includes a first pool 106 including volumes 108(1), 108(2), 108(3), 108(4), and 108(5). Further, the group 110 may include a second pool 112 including volumes 114(1), 114(2), 114(3), 114(4), and 114(5). In this example, volumes 108(1), 108(2), and 108(3) of first pool 106 may be replicated from first pool 106 to volumes 114(1), 114(2), and 114(3) of second pool 112, and volumes 114(4) and 114(5) of second pool 112 may be replicated from second pool 112 to volumes 108(4) and 108(5) of first pool 106. A first volume collection 124(1) may include volumes 108(1), 108(2), and 108(3) replicated from first pool 106 to volumes 114(1), 114(2), and 114(3) of second pool 112, and a second volume collection 124(2) may include volumes 114(4) and 114(5) replicated from second pool 112 to volumes 108(4) and 108(5) of first pool 106. Thus, first volume collection 124(1) may include the three upstream volumes 108(1), 108(2), and 108(3) of first pool 106 and three downstream volumes 114(1), 114(2), and 114(3) of second pool 112, and second volume collection 124(2) may include the two upstream volumes 114(4) and 114(5) of second pool 112 and two downstream volumes 108(4) and 108(5) of first pool 106. The pool partners corresponding to first pool 106 and second pool 112 may be listed in a table designated pool partner list at 602 (e.g., the pool partners table of FIG. 2), where the pool partners include the identical names as first pool 106 and second pool 112.

For the example of FIG. 6, in order to generate the configuration that is utilized by the replication control engine 126, a volume collection (e.g., volume collection 124(1)) to replicate from first pool 106 to second pool 112 may be generated by the following command:

volcoll --create volume collection 124(1) --replication_ type synchronous

In this example, the command "volcoll --create" may be used to create the volume collection 124(1). Further, the replication type with respect to volume collection 124(1) may include a synchronous replication type (e.g., "replication_type synchronous") for volumes 108(1), 108(2), and 108(3) replicated from first pool 106 to second pool 112. In this regard, the volume collection 124(1) may also provide a snapshot for the volumes 108(1), 108(2), and 108(3) at a specified time when the replication is performed from first pool 106 to second pool 112.

For the example of FIG. 6, in order to associate upstream volume(s) to a volume collection 124(1), the following commands may be utilized:

vol --assoc volume 108(1) --volcoll volume collection 124(1)
    vol --assoc volume 108(2) --volcoll volume collection 124(1)
    vol --assoc volume 108(3) --volcoll volume collection 124(1)

In this example, each of the volumes 108(1), 108(2), and 108(3) may be associated with (i.e., belong to) the volume collection 124(1). For example, per the command "vol --assoc volume 108(1) --volcoll volume collection 124(1)", volume 108(1) may be associated with volume collection 124(1). Based upon the association of the volume 108(1) with volume collection 124(1), volume collection 124(1) may provide a snapshot for the volume 108(1) (as well as the volumes 108(2), and 108(3)) at a specified time when the replication is performed from first pool 106 to second pool 112.

For the example of FIG. 6, in order to add a pool partner to the volume collection 124(1), the following command may be utilized:

volcoll --addsched volume collection 124(1) --schedule sched1 --num_retain_replica 20 --retain 10 --repeat 1 --repeat_unit hour --replicate_to second pool 112

In this example, a replication schedule "sched1" may also be added to replicate the volumes 108(1), 108(2), and 108(3) from first pool 106 to second pool 112 at a predetermined interval. The "num_retain_replica 20" may represent a number of replications that may be retained in memory. The "retain 10" may represent a number of replicas that are to be retained. The "repeat 1" may represent how often a replication is to be performed (e.g., every one hour). The "replicate_to second pool 112" may represent a destination for the replication. In this regard, a schedule may include an internally embedded partner (e.g., the partner for the second pool 112) for the replication.

For the example of FIG. 6, in order to generate the configuration that is utilized by the replication control engine 126, a volume collection (e.g., volume collection 124(2)) to replicate from second pool 112 to first pool 106 may be generated by the following command:

volcoll --create volume collection 124(2) --replication_type synchronous

In this example, the command "volcoll --create" may be used to create the volume collection 124(2). Further, the replication type with respect to volume collection 124(2) may include a synchronous replication type (e.g., "replication_type synchronous") for volumes 114(4) and 114(5) replicated from second pool 112 to volumes 108(4) and 108(5) of first pool 106. In this regard, the volume collection 124(2) may also provide a snapshot for the volumes 114(4) and 114(5) at a specified time when the replication is performed from second pool 112 to first pool 106.

For the example of FIG. 6, in order to associate upstream volume(s) to a volume collection 124(2), the following commands may be utilized:

vol --assoc volume 114(4) --volcoll volume collection 124(2)

vol --assoc volume 114(5) --volcoll volume collection 124(2)

In this example, each of the volumes 114(4) and 114(5) may be associated with (i.e., belong to) the volume collection 124(2). For example, per the command "vol --assoc 114(4) --volcoll volume collection 124(2)", volume 114(4) may be associated with volume collection 124(2). Based upon the association of the volume 114(4) with volume collection 124(2), volume collection 124(2) may provide a snapshot for the volume 114(4) (as well as the volume 114(5)) at a specified time when the replication is performed from second pool 112 to first pool 106.

For the example of FIG. 6, in order to add a pool partner to the volume collection 124(2), the following command may be utilized:

volcoll --addsched vc1 --schedule sched1 --num_retain_replica 20 --retain 10 --repeat 1 --repeat_unit hour --replicate_to first pool 106

In this example, a replication schedule "schedule sched1" may also be added to replicate the volumes 114(4) and 114(5) from second pool 112 to volumes 108(4) and 108(5) of first pool 106 at a predetermined interval. The "replicate_to first pool 106" may represent a destination for the replication. In this regard, a schedule may include an internally embedded partner (e.g., the partner for the first pool 106) for the replication.

For the example of FIG. 6, the volumes 108(1), 108(2), 108(3), 108(4), and 108(5) may be generated, for example, by utilizing the following command:

Vol -create volume 108(1) -first pool 106 -size 100

In this example, the volume 108(1) may be assigned to first pool 106 and include a size of 100.

The aforementioned commands related to generation of the configuration that is utilized by the replication control engine 126, association of a volume to a volume collection, and adding a pool partner to a volume collection may be performed in any sequence.

Figure 7:
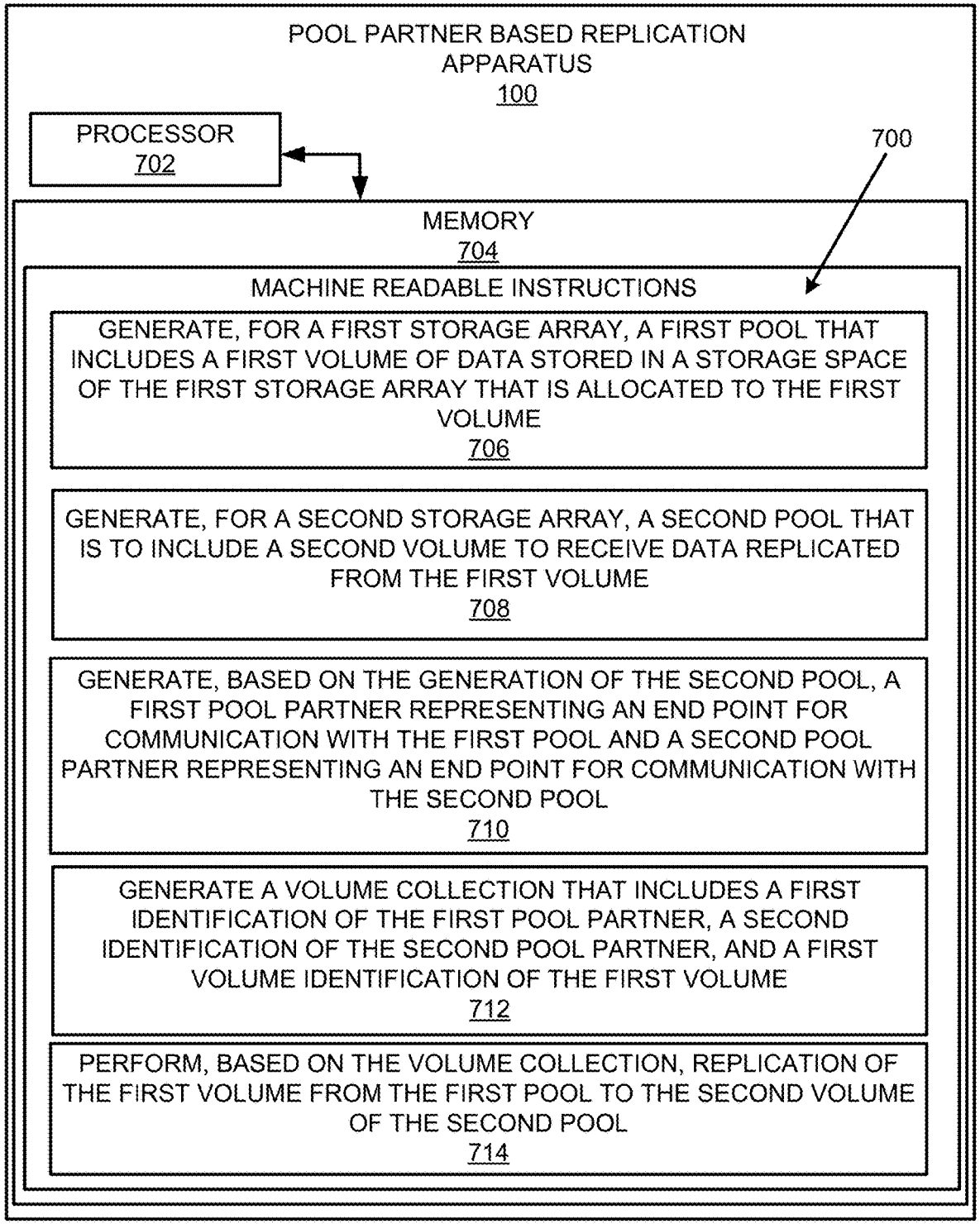
FIG. 7 illustrates an example block diagram for pool partner based replication.
Figure 9:
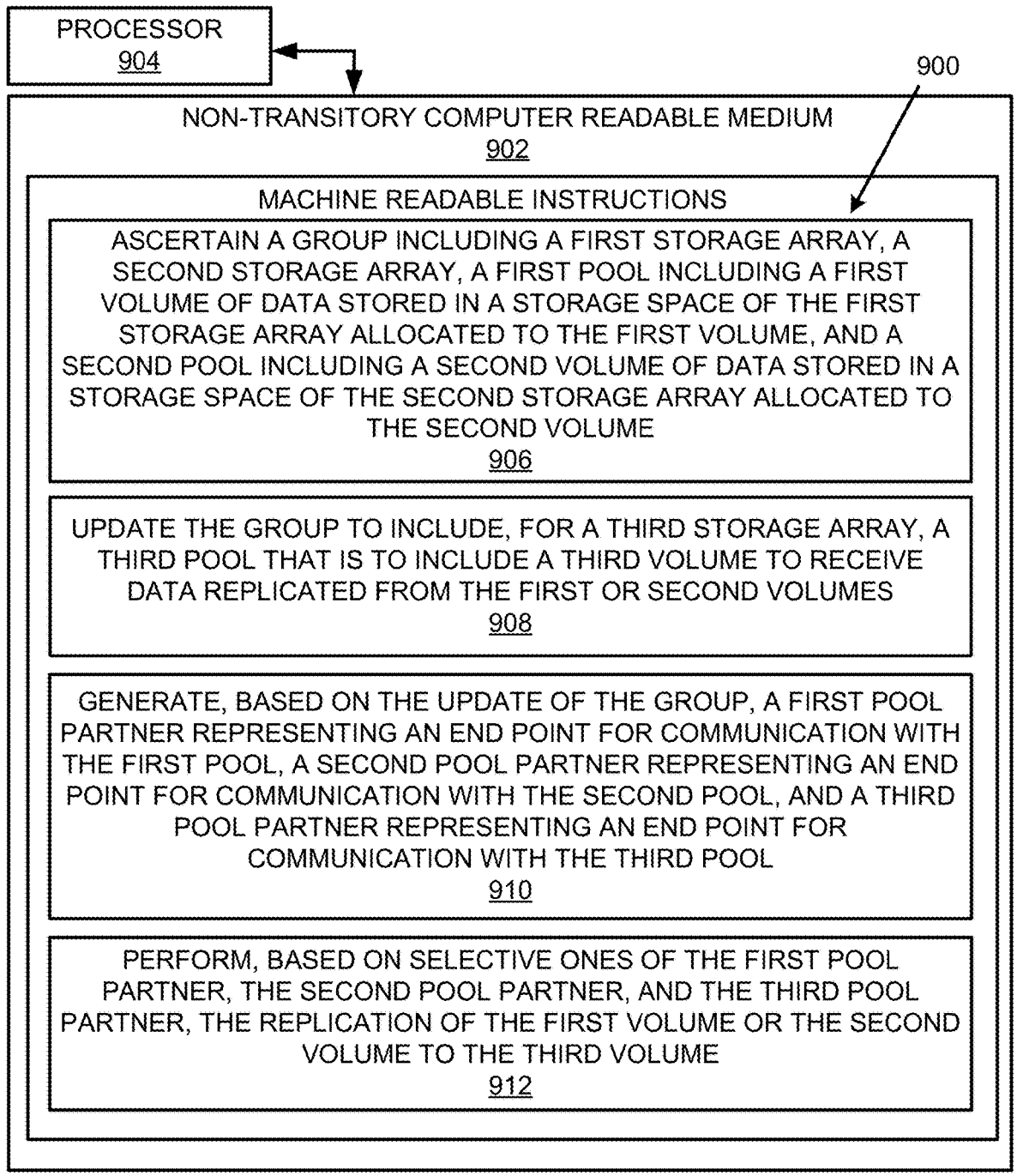
FIG. 9 illustrates a further example block diagram for pool partner based replication.

FIGS. 7-9 respectively illustrate an example block diagram 700, an example flowchart of a method 800, and a further example block diagram 900 for pool partner based replication. The block diagram 700, the method 800, and the block diagram 900 may be implemented on the apparatus 100 described above with reference to FIG. 1 by way of example and not limitation. The block diagram 700, the method 800, and the block diagram 900 may be practiced in other apparatus. In addition to showing the block diagram 700, FIG. 7 shows hardware of the apparatus 100 that may execute the instructions of the block diagram 700. The hardware may include a processor 702, and a memory 704 (i.e., a non-transitory computer readable medium) storing machine readable instructions that when executed by the processor 702 cause the processor to perform the instructions of the block diagram 700. The memory 704 may represent a non-transitory computer readable medium. FIG. 8 may represent an example method for pool partner based replication. FIG. 9 may represent an example non-transitory computer readable medium 902 having stored thereon machine readable instructions to provide pool partner based replication. The machine readable instructions, when executed, cause a processor 904 to perform the instructions of the block diagram 900 also shown in FIG. 9.

The processor 702 of FIG. 7 and/or the processor 904 of FIG. 9 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 902 of FIG. 9), such as hardware storage devices (e.g., RAM (random access memory), ROM (read only memory), EPROM (erasable, programmable ROM), EEPROM (electrically erasable, programmable ROM), hard drives, and flash memory). The memory 704 may include a RAM, where the machine readable instructions and data for a processor may reside during runtime.

Referring to FIGS. 1-7, and particularly to the block diagram 700 shown in FIG. 7, the memory 704 may include instructions 706 to generate, for a first storage array, a first pool 106 that includes a first volume of data stored in a storage space of the first storage array that is allocated to the first volume.

The processor 702 may fetch, decode, and execute the instructions 708 to generate, for a second storage array, a second pool 112 that is to include a second volume to receive data replicated from the first volume.

The processor 702 may fetch, decode, and execute the instructions 710 to generate, based on the generation of the second pool 112, a first pool partner 118 representing an end point for communication with the first pool 106 and a second pool partner 120 representing an end point for communication with the second pool 112.

The processor 702 may fetch, decode, and execute the instructions 712 to generate a volume collection 124 that includes a first identification of the first pool partner, a second identification of the second pool partner, and a first volume identification of the first volume.

The processor 702 may fetch, decode, and execute the instructions 714 to perform, based on the volume collection 124, replication of the first volume from the first pool 106 to the second volume of the second pool 112.

Referring to FIGS. 1-6 and 8, and particularly FIG. 8, for the method 800, at block 802, the method 800 may include generating, by a processor, for a first storage array of a group 110, a first pool 106 that includes a first volume of data stored in a storage space of the first storage array that is allocated to the first volume.

At block 804 the method 800 may include generating, by the processor, for a second storage array that is added to the group 110, a second pool 112 that that is to include a second volume to receive data replicated from the first volume from the first pool 106 to the second pool 112.

At block 806 the method 800 may include generating, by the processor, based on the generation of the second pool 112, a first pool partner 118 representing an end point for communication with the first pool 106 and a second pool partner 120 representing an end point for communication with the second pool 112.

At block 808 the method 800 may include generating, by the processor, a volume collection 124 that includes a first identification of the first pool partner, a second identification of the second pool partner, and a first volume identification of the first volume.

At block 810 the method 800 may include performing, by the processor, based on the volume collection 124, replication of the first volume from the first pool 106 to the second volume of the second pool 112.

Referring to FIGS. 1-6 and 9, and particularly FIG. 9, for the block diagram 900, the non-transitory computer readable medium 902 may include instructions 906 to ascertain a group 110 including a first storage array 104(1), a second storage array 105(1), a first pool 106 including a first volume 108(1) of data stored in a storage space of the first storage array 104(1) allocated to the first volume 108(1), and a second pool 112 including a second volume 114(1) of data stored in a storage space of the second storage array 105(1) allocated to the second volume 114(1).

The processor 904 may fetch, decode, and execute the instructions 908 to update the group 110 to include, for a third storage array, a third pool that is to include a third volume to receive data replicated from the first or second volumes.

The processor 904 may fetch, decode, and execute the instructions 910 to generate, based on the update of the group 110, a first pool partner 118 representing an end point for communication with the first pool 106, a second pool partner 120 representing an end point for communication with the second pool 112, and a third pool partner representing an end point for communication with the third pool.

The processor 904 may fetch, decode, and execute the instructions 912 to perform, based on selective ones of the first pool partner 118, the second pool partner 120, and the third pool partner, the replication of the first volume or the second volume to the third volume.

According to examples, the processor 904 may fetch, decode, and execute instructions to generate a further volume collection that includes identification of the first, second, and third pool partners, and identification of a fourth volume, a fifth volume, and a sixth volume respectively corresponding to the first, second, and third pools, and perform, based on the further volume collection, replication of the sixth volume from the third pool to the fourth volume of the first pool or the fifth volume of the second pool.

What has been described and illustrated herein is an example along with some of its variations. The terms, descriptions and figures used herein are set forth by way of illustration and are not meant as limitations. Many variations are possible within the spirit and scope of the subject matter, which is intended to be defined by the following claims— and their equivalents—in which all terms are meant in their broadest reasonable sense unless otherwise indicated.

What is claimed is:

1. An apparatus comprising:

a processor; and a non-transitory computer readable medium storing machine readable instructions that when executed by the processor cause the processor to:

generate, for a first storage array, a first pool that includes a first volume of data stored in a storage space of the first storage array that is allocated to the first volume;

generate, for a second storage array, a second pool that is to include a second volume to receive data replicated from the first volume;

in response to the generation of the second pool, generate a first pool partner representing an end point for communication with the first pool and a second pool partner representing an end point for communication with the second pool;

generate a volume collection that includes a first identification of the first pool partner, a second identification of the second pool partner, and a first volume identification of the first volume; and perform, based on the volume collection, replication of the first volume from the first pool to the second volume of the second pooh, wherein the instructions to perform the replication of the first volume to the second volume comprise instructions to:

validate a key associated with the first pool partner with a key associated with the second pool partner; and initiate, upon the validation of the key associated with the first pool partner with the key associated with the second pool partner and based on the volume collection, the replication of the first volume from the first pool to the second volume of the second pool.

2. The apparatus according to claim 1, wherein the replication includes synchronous replication of the first volume from the first pool to the second volume of the second pool.

3. The apparatus according to claim 1, wherein the first pool includes a first set of volumes including the first volume, the second pool includes a second set of volumes including the second volume, and wherein the instructions to perform, based on the volume collection, replication of the first volume from the first pool to the second volume of the second pool are further to cause the processor to:

perform, based on the volume collection; replication of the first set of volumes from the first pool to the second set of volumes of the second pool.

4. The apparatus according to claim 1, wherein the instructions are further to cause the processor to:

generate a further volume collection that includes identification of the first and second pool partners, and identification of a third volume and a fourth volume respectively corresponding to the first and second pools; and perform, based on the further volume collection, replication of the fourth volume from the second pool to the third volume of the first pool.

5. The apparatus according to claim 4, wherein the first pool includes a third set of volumes including the third volume, and the second pool includes a fourth set of volumes including the fourth volume, and wherein the instructions to perform, based on the further volume collection, replication of the fourth volume from the second pool to the third volume of the first pool are further to cause the processor to:

perform, based on the further volume collection, replication of the fourth set of the volumes from the second pool to the third set of the volumes of the first pool.

6. The apparatus according to claim 1, Wherein the instructions to generate, in response to the generation of the second pool, the first pool partner representing the end point for communication with the first pool and the second pool partner representing the end point for communication with the second pool are further to cause the processor to:

generate the first pool partner to include:
a first pool partner unique identifier,
a first pool partner name that matches a name of the first pool, and
a first pool unique identifier of the first pool; and generate the second pool partner to include:
a second pool partner unique identifier,
a second pool partner name that matches a name of the second pool; and
a second pool unique identifier of the second pool.

7. The apparatus according to claim 1, wherein the instructions to perform the replication of the first volume to the second volume comprise instructions to:

receive data to be stored to the first volume;
commit the received data to the first volume;
commit the data committed to the first volume to the second volume; and
generate an acknowledgement of the commitment to the second volume.

8. A computer implemented method comprising:

generating, by a processor, for a first storage array of a group, a first pool that includes a first volume of data in a storage space of the first storage array that is allocated to the first volume;

generating, the processor, for a second storage array that is added to the group, a second pool that is to include a second volume to receive data replicated from the first volume from the first pool to the second pool;

in response to the generation of the second pool, generating, by the processor, a first pool partner representing an end point for communication with the first pool and a second pool partner representing an end point for communication with the second pool;

generating, by the processor, a volume collection that includes a first identification of the first pool partner, a second identification of the second pool partner, and a first volume identification of the first volume; and performing, based on the volume collection, replication of the first volume from the first pool to the second volume of the second pool, wherein performing the replication of the first volume to the second volume comprises:

validating a communication session associated with the first and second pool partners;

initiating, upon the validation of the communication session and based on the volume collection, the replication of the first volume from the first pool to the second volume of the second pool.

9. The method according to claim 8, wherein the replication includes synchronous replication of the first volume from the first pool to the second volume of the second pool.

10. The method according to claim 8, wherein the first pool includes a first set of volumes including the first volume, the second pool includes a second set of volumes including the second volume, and wherein performing, based on the volume collection, replication of the first volume from the first pool to the second volume of the second pool further comprises:

performing, based on the volume collection, replication of the first set of volumes from the first pool to the second set of second volumes of the second pool.

11. The method according to claim 8, further comprising:

generating a further volume collection that includes identification of the first and second pool partners, and identification of a third volume and a fourth volume respectively corresponding to the first and second pools; and performing, based on the further volume collection, replication of the fourth volume from the second pool to the third volume of the first pool.

12. The method according to claim 11, wherein the first pool includes a third set of volumes including the third volume, and the second pool includes a fourth set of volumes including the fourth volume, and wherein performing, based on the further volume collection, replication of the fourth volume from the second pool to the third volume of the first pool further comprises:

performing, based on the further volume collection, replication of the fourth set of the volumes from the second pool to the third set of the volumes of the first pool.

13. The method according to claim 8, wherein generating, based on the generation of the second pool, the first pool partner representing the end point for communication with the first pool and the second pool partner representing the end point for communication with the second pool further comprises:

generating the first pool partner to include
a first pool partner unique identifier, and
a first pool unique identifier of the first pool; and generating the second pool partner to include
a second pool partner unique identifier, and
a second pool unique identifier of the second pool.

14. The method according to claim 8, wherein performing, based on the volume collection, the replication of the first volume from the first pool to the second volume of the second pool further comprises:

receiving data to be stored to the first volume;
committing the received data to the first volume;
committing the data committed to the first volume to the second volume; and
generating an acknowledgement of the commitment to the second volume.

15. A non-transitory computer readable medium having stored thereon machine readable instructions, the machine readable instructions, when executed, cause a processor to:

ascertain a group including a first storage array, a second storage array, a first pool including a first volume of data stored in a storage space of the first storage array allocated to the first volume, and a second pool including a second volume of data stored in a storage space of the second storage array allocated to the second volume;

update the group to include, for a third storage array, a third pool that is to include a third volume to receive data replicated from the first or second volumes;

generate, based on the update of the group, a first pool partner representing an end point for communication with the first pool, a second pool partner representing an end point for communication with the second pool, and a third pool partner representing an end point for communication with the third pool; and perform, based on the first pool partner and the third pool partner, replication of the first volume to the third volume, the instructions to perform the replication of the first volume to the third volume comprising instructions to:
  validate at least one secret, for communication authentication, associated with the first and third pool partners;
  initiate, upon the validation of the at least one secret and based on the volume collection, the replication of the first volume from the first pool to the third volume of the third pool.

16. The non-transitory computer readable medium according to claim 15, wherein the first pool includes a first set of volumes including the first volume, the second pool includes a second set of volumes including the second volume, and the third pool includes a third set of volumes including the third volume, and wherein the machine readable instructions to perform, based on selective ones of the pool partners, the replication of the first volume to the third volume, when executed, further cause the processor to:
  perform, based on the first pool partner and the third pool partner, the replication of the first set of volumes to the third set of volumes.

17. The non-transitory computer readable medium according to claim 15, wherein the machine readable instructions to perform the replication of the first volume to the third volume comprise instructions to:
  generate a volume collection that includes identification of the first pool partner, the second pool partner, and the third pool partner, and a first identification of the first volume and a second identification of the second volume; and
  perform, based on the volume collection, the replication of the first volume to the third volume.

18. The non-transitory computer readable medium according to claim 17, wherein the machine readable instructions, when executed, further cause the processor to:
  generate a further volume collection that includes identification of the first pool partner, the second pool partner, and the third pool partner, and identification of a fourth volume, a fifth volume, and a sixth volume respectively corresponding to the first, second, and third pools; and
  perform, based on the further volume collection, replication of the sixth volume from the third pool to the fourth volume of the first pool or the fifth volume of the second pool.

19. The non-transitory computer readable medium according to claim 18, wherein the first pool includes a fourth set of volumes including the fourth volume, the second pool includes a fifth set of volumes including the fifth volume, and the third pool includes a sixth set of volumes including the sixth volume, and wherein the machine readable instructions to perform, based on the further volume collection, replication of the sixth volume from the third pool to the fourth volume of the first pool or the fifth volume of the second pool, when executed, further cause the processor to:
  perform, based on the further volume collection, replication of the sixth set of the volumes from the third pool to the fourth set of the volumes of the first pool or the fifth set of volumes of the second pool.

20. The non-transitory computer readable medium according to claim 15, wherein the machine readable instructions to generate, based on the update of the group, the first pool partner representing the end point for communication with the first pool, the second pool partner representing the end point for communication with the second pool, and the third pool partner representing the end point for communication with the third pool, when executed, further cause the processor to:
  generate the first pool partner to include
    a first pool partner unique identifier,
    a first pool partner name that matches a name of the first pool, and
    a first pool unique identifier of the first pool;
  generate the second pool partner to include
    a second pool partner unique identifier,
    a second pool partner name that matches a name of the second pool; and
    a second pool unique identifier of the second pool; and
  generate the third pool partner to include
    a third pool partner unique identifier,
    a third pool partner name that matches a name of the third pool, and
    a third pool unique identifier of the third pool.

\* \* \* \* \*